United States Patent
Kubo

(10) Patent No.: US 9,256,616 B2
(45) Date of Patent: Feb. 9, 2016

(54) IMAGE PROCESSING APPARATUS AND IMAGE PROCESSING METHOD

(71) Applicant: CANON KABUSHIKI KAISHA, Tokyo (JP)

(72) Inventor: Takuya Kubo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/246,886

(22) Filed: Apr. 7, 2014

(65) Prior Publication Data
US 2014/0301667 A1    Oct. 9, 2014

(30) Foreign Application Priority Data

Apr. 9, 2013    (JP) .................................. 2013-081657

(51) Int. Cl.
*G06F 17/30*    (2006.01)
(52) U.S. Cl.
CPC ................................. *G06F 17/30247* (2013.01)
(58) Field of Classification Search
None
See application file for complete search history.

(56) References Cited

U.S. PATENT DOCUMENTS

| | | | | |
|---|---|---|---|---|
| 2004/0081338 A1* | 4/2004 | Takenaka | ...................... | 382/118 |
| 2005/0179780 A1* | 8/2005 | Kikkawa et al. | ......... | 348/207.99 |
| 2007/0019863 A1* | 1/2007 | Ito | .................................. | 382/190 |
| 2007/0047824 A1* | 3/2007 | Ito | .................................. | 382/228 |
| 2007/0110321 A1* | 5/2007 | Okada et al. | ................... | 382/209 |
| 2007/0146539 A1* | 6/2007 | Kawahara et al. | ............. | 348/370 |
| 2007/0165951 A1* | 7/2007 | Akahori et al. | ............... | 382/195 |
| 2007/0172155 A1* | 7/2007 | Guckenberger | .............. | 382/305 |
| 2011/0064396 A1* | 3/2011 | Tanabe | ........................... | 396/49 |
| 2011/0074970 A1* | 3/2011 | Sukegawa | .................. | 348/222.1 |
| 2011/0135151 A1* | 6/2011 | Jang | ............................... | 382/103 |
| 2014/0184858 A1* | 7/2014 | Yu et al. | ........................ | 348/241 |
| 2014/0301667 A1* | 10/2014 | Kubo | ............................ | 382/305 |

FOREIGN PATENT DOCUMENTS

JP        2006-260483 A    9/2006

* cited by examiner

Primary Examiner — Sean Motsinger
(74) Attorney, Agent, or Firm — Cowan, Liebowitz & Latman, P.C.

(57) ABSTRACT

An image processing apparatus comprises a storage unit configured to store feature information of a predetermined object, a determination unit configured to detect feature information of an object from an image to be searched and determine a similarity to the feature information of the predetermined object stored in the storage unit, a search unit configured to search a candidate image containing the predetermined object as a result of the determination by the determination unit, and a control unit configured to control, based on attribute information associated with image-shooting conditions, the order in which images are subjected to the determination processing by the determination unit.

19 Claims, 19 Drawing Sheets

| FILE NAME (301) | IMAGE (302) | SHOOTING MODE (303) | |
|---|---|---|---|
| IMG_0001.JPG |  | LANDSCAPE | ~304 |
| IMG_0002.JPG |  | PORTRAIT | ~305 |
| IMG_0003.JPG |  | UNDERWATER | |
| IMG_0004.JPG |  | SPORTS | |
| IMG_0005.JPG |  | NIGHT SCENE | |
| IMG_0006.JPG |  | PORTRAIT | ~306 |
| IMG_0007.JPG |  | LANDSCAPE | |
| IMG_0008.JPG |  | KIDS | ~307 |
| IMG_0009.JPG |  | KIDS | ~308 |

FIG. 3B

| SEARCH ORDER | FILE NAME | IMAGE | SHOOTING MODE |
| --- | --- | --- | --- |
| 1 | IMG_0002.JPG |  | PORTRAIT |
| 2 | IMG_0006.JPG |  | PORTRAIT |
| 3 | IMG_0008.JPG |  | KIDS |
| 4 | IMG_0009.JPG |  | KIDS |
| 5 | IMG_0004.JPG |  | SPORTS |
| 6 | IMG_0001.JPG |  | LANDSCAPE |
| 7 | IMG_0007.JPG |  | LANDSCAPE |
| 8 | IMG_0005.JPG |  | NIGHT SCENE |
| 9 | IMG_0003.JPG |  | UNDERWATER |

FIG. 3C

| ANALYSIS ORDER | FILE NAME | IMAGE | SHOOTING MODE | FEATURE AMOUNT | |
|---|---|---|---|---|---|
| 1 | IMG_0002.JPG |  | PORTRAIT | xcnsdju9zanx83s97bnws6vvje86q23hnsv8vm2qc7as8k9cq2kncq0aweuica823uszsvn892v0ccbnan89q23a | ~320 |
| 2 | IMG_0006.JPG | 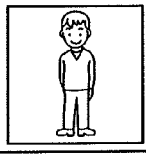 | PORTRAIT | cb9q7234q98xnfah293cb90nx223vnxcnawbeyqwe2341caweiuq239047bvanc7bcq234n0xq2bcnv9n7xnn7cv | ~321 |
| 3 | IMG_0008.JPG |  | KIDS | nx883n8zhki834jkcwhjzcjy8oqua78238xkjbgaw76hjbscesce8wcn83au347akxw87xawix393934nc9aueu9 | |
| 4 | IMG_0009.JPG |  | KIDS | nmcn80ccqaanm2qx823nbcnhua2bvaxn2qbcq3x823nx0vdsunav873cxqka789a2cnxwbncvwa7ra2390eruysd | |
| 5 | IMG_0004.JPG | 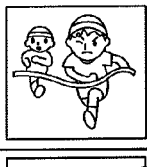 | SPORTS | nc12389xmvsuaduasuuqsdoqwcmaxkmudew88w392xmziaq9a383ukrukzkaall9ZAWl9awda9a0938lzwqliZqr | |
| 6 | IMG_0001.JPG | 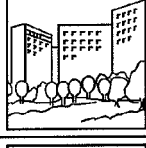 | LANDSCAPE | N/A | |
| 7 | IMG_0007.JPG | 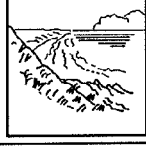 | LANDSCAPE | N/A | |
| 8 | IMG_0005.JPG |  | NIGHT SCENE | N/A | |
| 9 | IMG_0003.JPG | 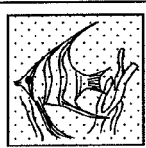 | UNDERWATER | N/A | |

FIG. 4

| ID | PERSON NAME | FACE IMAGE 1 | FACE IMAGE 2 | FEATURE AMOUNT |
|---|---|---|---|---|
| 401 | 402 | 403 | 404 | 405 |
| 1 | TARO | | | fas42390u8vxcngh23 40jflasj23018ln2142v na018u0qafsdfjlnv23 q90cvnaslm023401n aclsd0231hsnmvaxc o29t5wmopqrewvb7d |
| 2 | JIRO | | | 902lkanvxc1987t238 9234hasdfnasvnaiqh vn9q398ux0921b6bv 632xmzm912742348 cv728q1maxcvnbvgo w02340cc79p230vnz |
| 3 | HANAKO | | | 23894cnwyb893247x cbbbbnx7z2zsdj23vz ng0230234mazla02x 047b6zxmxmm9a190 q12c8nv459n79123z wuerqwcvbho28cx2l |

F I G. 7

| PRIORITY LEVEL OF ANALYSIS 701 | SHOOTING MODE 702 | |
|---|---|---|
| 1 | PORTRAIT | ~703 |
| 2 | KIDS | ~704 |
| 3 | SPORTS | |
| 4 | PROGRAM | |
| 5 | LANDSCAPE | |
| 6 | NIGHT SCENE | |
| 7 | UNDERWATER | |

F I G. 10

| SHOOTING MODE | TOTAL NUMBER OF IMAGES OF EACH SHOOTING MODE | NUMBER OF IMAGES TO WHICH PERSON NAME IS ADDED | PERCENTAGE IN WHICH PERSON NAME IS ADDED |
|---|---|---|---|
| KIDS | 150 | 120 | 80% |
| PORTRAIT | 300 | 210 | 70% |
| LANDSCAPE | 400 | 100 | 25% |
| UNDERWATER | 100 | 5 | 5% |
| FIREWORKS | 50 | 0 | 0% |

| FILE NAME | IMAGE | FOCAL LENGTH | PERSON NAME | KEYWORD | |
|---|---|---|---|---|---|
| IMG_0001.JPG |  | 30mm | N/A | LANDSCAPE | ~1201 |
| IMG_0002.JPG |  | 10mm | Jiro | KIDS | ~1202 |
| IMG_0003.JPG |  | 20mm | N/A | FAMILY | ~1203 |
| IMG_0004.JPG |  | 40mm | N/A | BEACH | ~1204 |
| IMG_0005.JPG |  | 8mm | Jiro | FAMILY | ~1205 |
| IMG_0006.JPG |  | 30mm | N/A | LANDSCAPE | ~1206 |

F I G. 13B
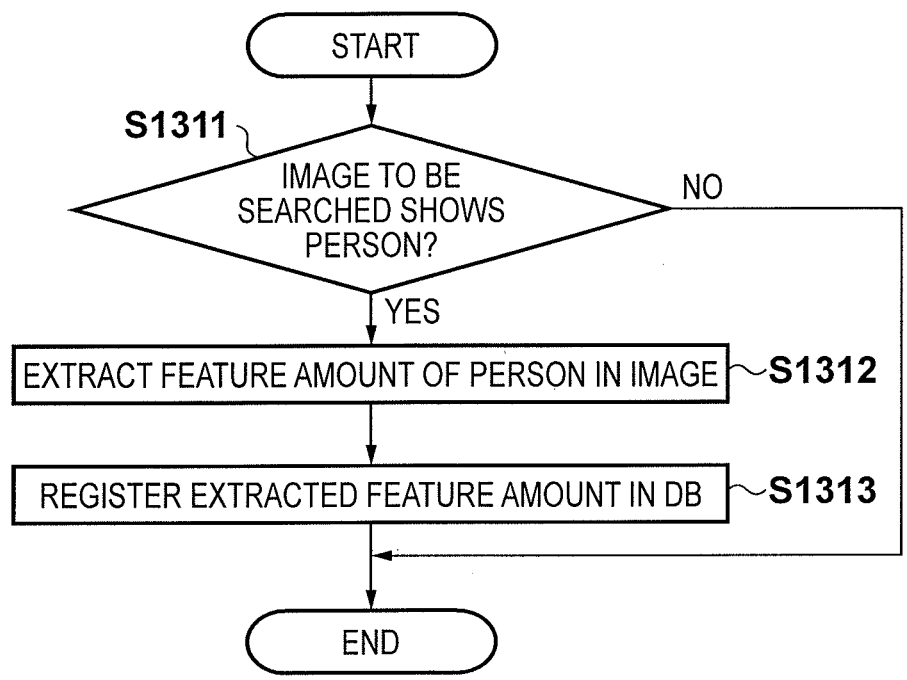

IMAGE PROCESSING APPARATUS AND IMAGE PROCESSING METHOD

BACKGROUND OF THE INVENTION

1. Field of the Invention

The present invention relates to an image processing technique for searching for an image containing a predetermined object.

2. Description of the Related Art

An application is known that is capable of analyzing the feature information, such as a person's face, of an object contained in an image and adding the analysis result as the person name to the image. The image to which the person name has been added can be used as one of the images to be searched, when searching for an image containing an object specified by a person name. Here, in the case of searching for who the person contained in an image is, there is a method of efficiently performing the search using other information, in addition to the feature information such as the person's face.

For example, Japanese Patent Laid-Open No. 2006-260483 discloses, when a person in a shot image is being searched for, using a database in which attribute area information corresponding to the address is registered in addition to the feature information of the person's face, preferentially searching for people with attribute area information that matches the shooting location information of the shot image.

Digital cameras can shoot a large number of images, and therefore numerous images may be retained in an application, in some cases. Further, since it is common to save only shot images in such a digital camera, setting additional information for searching images, as done in Japanese Patent Laid-Open No. 2006-260483, is troublesome for the user. On the other hand, in the case of searching for a specific person only by using shot images, it takes time to conduct the search because the face feature information is required to be analyzed as many times as the number of images to be searched.

SUMMARY OF THE INVENTION

The present invention has been made in consideration of the aforementioned problems, and realizes a technique capable of efficiently searching for an image containing a predetermined object, thereby reducing user waiting time for the search result.

In order to solve the aforementioned problems, the present invention provides an image processing apparatus comprising: a storage unit configured to store feature information of a predetermined object; a determination unit configured to detect feature information of an object from an image to be searched and determine a similarity to the feature information of the predetermined object stored in the storage unit; a search unit configured to search a candidate image containing the predetermined object as a result of the determination by the determination unit, and a control unit configured to control, based on attribute information associated with image-shooting conditions, the order in which images are subjected to the determination processing by the determination unit.

In order to solve the aforementioned problems, the present invention provides an image processing method comprising the steps of: storing feature information of a predetermined object in a storage unit; detecting feature information of an object from an image to be searched; determining a similarity to the feature information of the predetermined object stored in the storage unit; searching a candidate image containing the predetermined object as a result of the determination, and controlling, based on attribute information associated with image-shooting conditions, the order of processing the images in the determining step.

According to the present invention, it is possible to efficiently search for an image containing a predetermined object, thereby reducing user waiting time for the search result.

Further features of the present invention will become apparent from the following description of exemplary embodiments (with reference to the attached drawings).

BRIEF DESCRIPTION OF THE DRAWINGS

FIG. 3B is a view showing the images to be searched in FIG. 3A which are put in order of their priority level corresponding to the attribute information.

FIG. 3C is a view showing the images to be searched in FIG. 3A which are put in order of their priority level corresponding to the attribute information.

FIG. 4 is a view exemplifying a database configuration of this embodiment in which person feature amounts are registered.

FIG. 7 is a view exemplifying the relationship of this embodiment between an image shooting mode and the corresponding priority level in person search processing.

FIG. 10 is a view exemplifying the number of images of this embodiment for the shooting mode registered in the image management application.

FIGS. 13A and 13B are flow charts showing person search processing and feature amount-registration processing of the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Hereinafter, an embodiment in which an image processing apparatus of the present invention is applied, for example, to an information processing apparatus such as a personal computer (PC) storing image data captured by an image capturing apparatus such as a digital camera is described.

<Apparatus Configuration>

A configuration of an information processing apparatus of this embodiment according to the present invention is described with reference to FIG. 1.

In this embodiment, an example of processing of searching image data stored in the apparatus for a person designated by the user, performed by an image management application executed on the information processing apparatus, is described.

Figure 1:
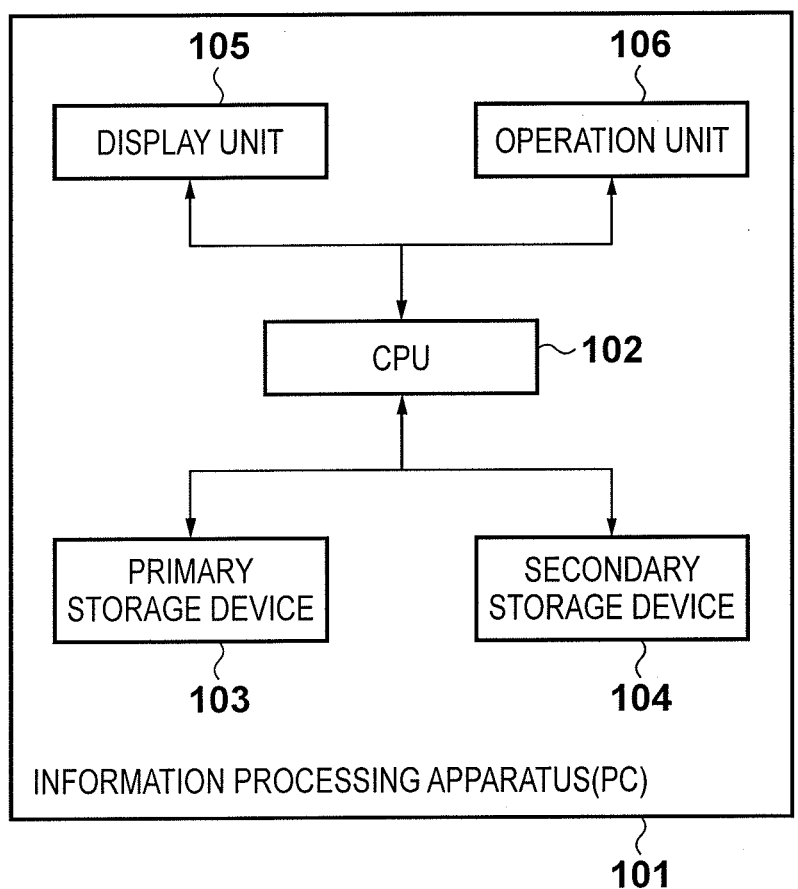
FIG. 1 is a block diagram showing an apparatus configuration of this embodiment.

In FIG. 1, an information processing apparatus 101 is a PC in which the image management application is installed. The information processing apparatus 101 has a CPU 102, a primary storage device 103, a secondary storage device 104, a display unit 105, and an operation unit 106. The CPU 102 is a central processing unit that is responsible for the overall control of the apparatus. The primary storage device 103 is a RAM that functions as a main memory of the CPU 102. A control program, etc., to be executed by the CPU 102 for implementing various types of processing, which will be mentioned later, is loaded, for example, from a nonvolatile memory into the primary storage device 103. Further, the primary storage device 103 provides a work area for the CPU 102 to execute such various types of processing. The secondary storage device 104, for example, is a hard disk storing operating procedures (such as programs, for example, for booting or basic input/output processing of the computer) of the CPU 102. The secondary storage device 104 is used for storing and loading application programs, image data, etc. In addition, a media drive such as optical (magnetic) disc drives, e.g., a memory card, DVD, CD-ROM, and MO, may be provided. The display unit 105 is a display such as LCD and organic EL, the contents of which are controlled by the CPU 102 so as to output screen images of the image management application, which will be mentioned later. The operation unit 106 is an input apparatus, such as a keyboard and a pointing device, which receives a user operation.

Further, the information processing apparatus 101 can be connected to a computer network, such as the internet, via a wired or wireless communication line, and can transmit and receive image data, etc., to and from external devices in communication via the computer network.

<Application Screen>

Figure 2A:
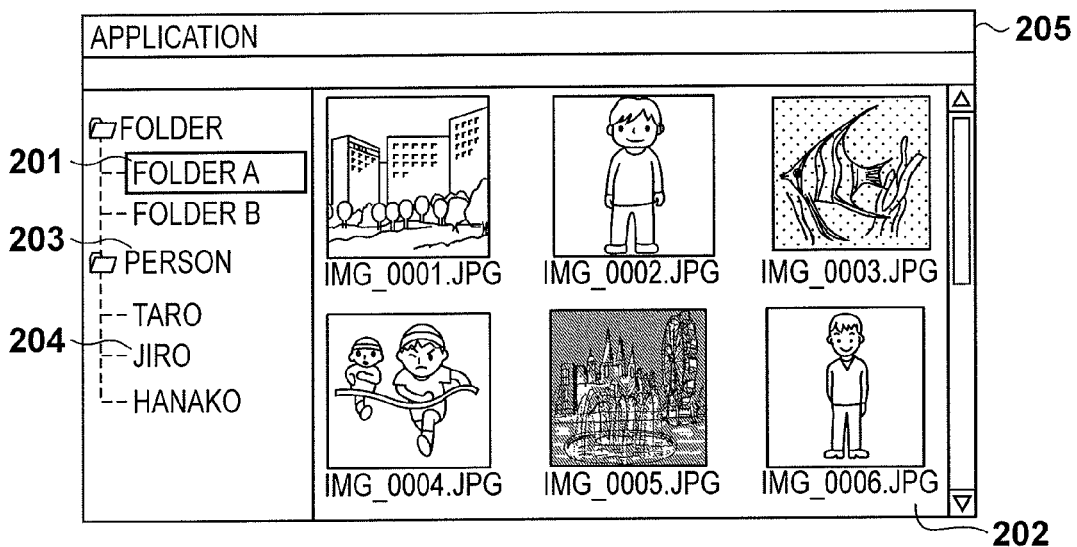
FIGS. 2A to 2C are views exemplifying a screen of an image management application of this embodiment.

FIG. 2A exemplifies an application screen of this embodiment displayed by the image management application. An application screen 205 can display a list of images registered in the database. For example, when the user selects a folder A (201) via the operation unit 106, images stored in the folder A are displayed in an image display area 202. In the case where not all registered images can be displayed in the image display area 202 due to there being a large number of registered images, the rest of the images not being displayed in the image display area 202 can be displayed by the user scrolling the screen with a scroll bar 206 on the application screen 205.

The image management application of this embodiment can execute person search processing, as one of its functions, by designating a person name. Although the person search processing will be described later in detail, upon selection of an arbitrary person name registered in the database, the image management application can search for images showing the selected person and display the search results in the image display area 202 as candidate images. Person names registered in the database are displayed in a person tree 203. In the application screen 205, the names of three individuals, "Taro", "Jiro", and "Hanako", for example, are registered. In FIG. 2A, for example, when the user selects "Jiro" denoted by 204, the image management application searches for images having the person name "Jiro" as attribute information, and displays the search results in the image display area 202 as candidate images. In this embodiment, the description is given under the assumption that nine images and three person names are registered in the database of the image management application, as shown in FIG. 3A.

<Database Configuration>

Figure 3A:
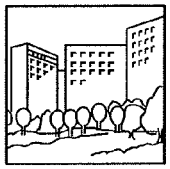
FIG. 3A is a view exemplifying attribute information of images to be searched of this embodiment.
Figure 3A:
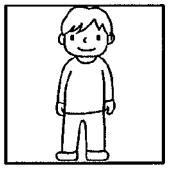
Figure 3A:
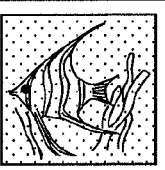
Figure 3A:
Figure 3A:
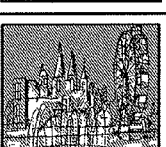
Figure 3A:
Figure 3A:
Figure 3A:
Figure 3A:

FIG. 3A exemplifies nine images registered in the database of the image management application, where a column 301 shows the file name of each image, a column 302 shows the image of each image file, and a column 303 shows the shooting mode at the time of shooting the image.

FIG. 4 exemplifies a database configuration for the person names registered in the image management application.

In FIG. 4, a column 401 shows ID for classifying each person, which is a serial number starting from the integer 1. A column 402 shows each person name, and the person names 402 are displayed in the person tree 203 in FIG. 2. Columns 403 and 404 show a face image corresponding to each person. Because of the diversity of expression of a person, the accuracy in the person search, which will be mentioned later, is improved by registering a plurality of face images, as compared to registering a single face image. Therefore, two face images of a person are registered in this embodiment. Although the accuracy is further improved by registering three or more face images, the following description is given on the assumption that two face images are registered, for convenience of description. A column 405 shows the feature amount of a person calculated from the two face images (e.g., values associated with the position of the face, the size of the face, and the reliability). Using these feature amount, person search processing, which will be mentioned below, is performed.

<Person Search Processing>

Next, person search processing by the image management application of this embodiment is described with reference to FIG. 5. The description is given for a process of executing person search processing when the user selects "Jiro" denoted by 204 from the person tree 203 on the application screen 205 of FIG. 2, so as to display candidate images showing the selected person. It should be noted that the process of FIG. 5 is implemented by the CPU 102 of the information processing apparatus 101 deploying an image management application program stored in the secondary storage device 104 in the work area of the primary storage device 103 and executing it.

Figure 5:
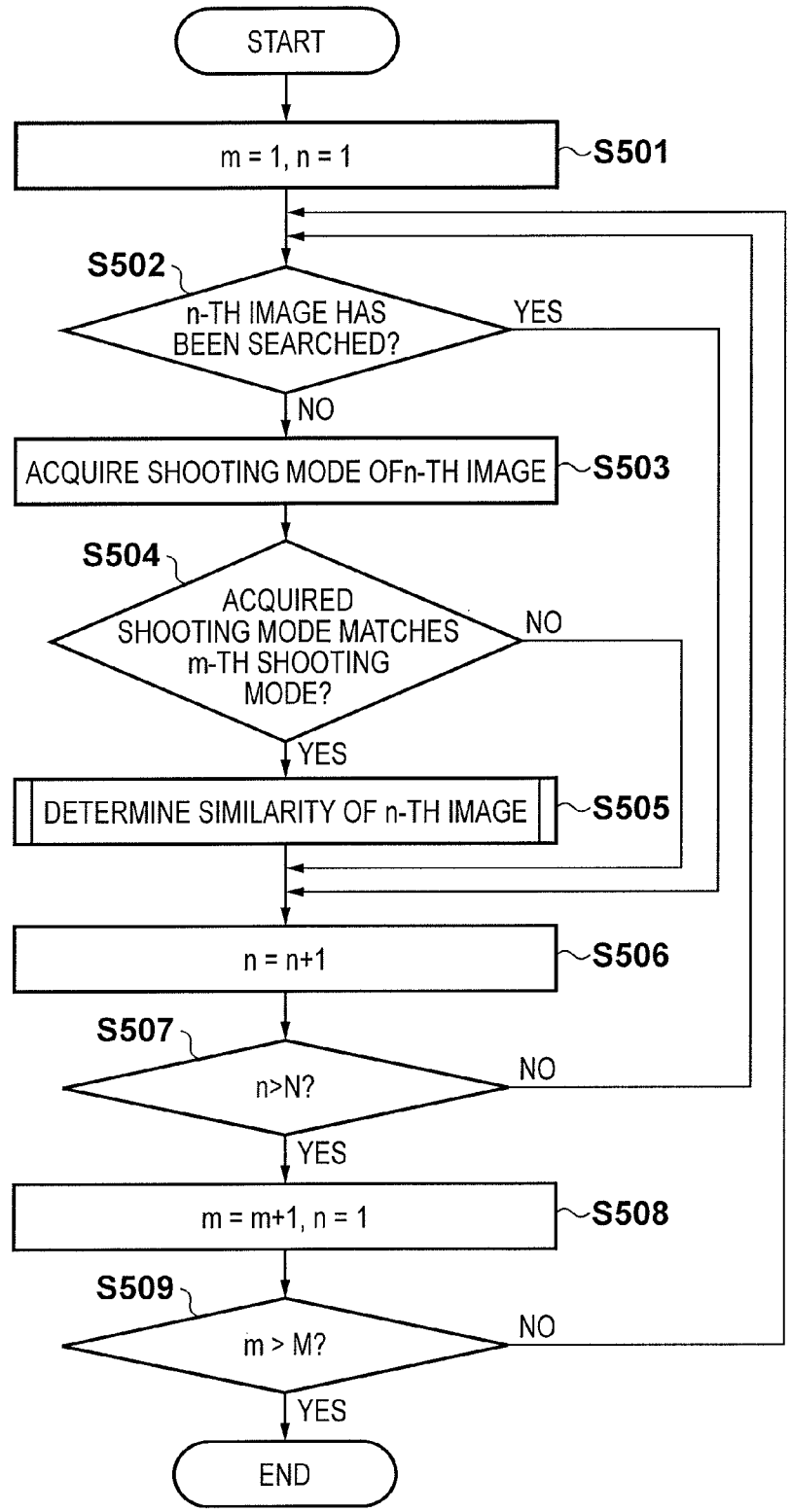
FIG. 5 is a flow chart showing person search processing of this embodiment executed by the image management application.

In S501 of FIG. 5, the CPU 102 initializes the values of m and n to 1 when the person name 204 is selected from the person tree 203 of FIG. 2. Here, the value of m serves as an index representing the shooting mode. In this embodiment, the image management application executes person search processing on images in descending order of their priority level corresponding to the shooting mode. It is also conceivable to search the images simply in ascending order of their file name. However, if an image showing "Jiro (204)", for example, is located near the end of the queue of data to be searched, it takes time to display the image of "Jiro (204)" from the time when "Jiro (204)" is selected from the person tree 203. Therefore, in this embodiment, the search is performed in descending order of the shooting mode that has a higher probability of showing "Jiro (204)".

FIG. 7 exemplifies the relationship between the priority level and the shooting mode of the image to be searched. A column 701 shows the priority level of the images that are subject to person search processing, which corresponds to the value of m in S501 of FIG. 5. The highest priority level is given to images with a shooting mode 702 of Portrait 703. Since images shot in Portrait mode have a high probability that the user consciously shot a person, the highest priority level is given. The second highest priority level is given to images with the shooting mode 702 of Kids 704. Since images shot in Kids mode also have a high probability that the user consciously shot kids, a high priority level is given. In this way, it is possible to efficiently find the person being searched for by setting a high priority level for images with a high probability that the user consciously shot a person and thereby preferentially analyzing the face feature information (hereinafter, referred to as face information) of such images. The table of FIG. 7 that defines the relationship between a priority level and the corresponding shooting mode is stored in the image management application.

Returning to the description of FIG. 5, the value of n in S501 serves as an index representing the images to be searched. That is, the image when the value of n is 1 corresponds to an image file 304 in FIG. 3A. Likewise, the image when the value of n is 2 corresponds to an image file 305 in FIG. 3A. After the completion of initialization in S501, the process proceeds to S502, and the CPU 102 determines whether or not the first image has been searched. Since the first image file 304 has not been searched, the process proceeds to S503.

In S503, the CPU 102 acquires the shooting mode of the first image. Such shooting mode information is assumed to be included in the image. As shown in FIG. 3A, the shooting mode of the first image file 304 is Landscape.

In S504, the CPU 102 determines whether or not the acquired shooting mode matches the m-th shooting mode. The acquired shooting mode is Landscape, and the shooting mode when the value of m is 1 is Portrait 703, as shown in FIG. 7. Therefore, these shooting modes do not match each other. Thus, the process proceeds to S506.

In S506, the CPU 102 increments the value of n. Accordingly, the value of n is set to 2. The reason for incrementing the value of n is to proceed to the next image to be searched.

In S507, the CPU 102 compares the values of n and N to each other. The value of N is the total number of images to be searched, that is, the number of images registered in the image management application. As shown in FIG. 3A, nine images are registered in the image management application. Thus, the value of N is 9. Accordingly, the value of n is smaller than the value of N, at present. Thus, the process returns to S502. The same process as mentioned above is repeated in S502 and S503, and thus the description thereof is omitted.

In S504, the CPU 102 determines that the shooting mode of the second image is Portrait and thus matches the shooting mode when the value of m is 1. Thus, the process proceeds to S505.

In S505, the CPU 102 determines whether or not "Jiro" is contained in the second image. Upon determining that "Jiro" is contained in the second image, though the similarity determination in S505 will be described later in detail, the CPU 102 displays the second image as a search result. In the case where "Jiro" is not contained in the second image, the CPU 102 does nothing.

As the above processes are repeated for each of the nine images to be searched, the value of n reaches 10 in S506. At this point, among the registered nine images, those with a Portrait shooting mode are images 305 and 306, and thus these two images are considered to have been searched.

In S507, the CPU 102 compares the value of n and the value of N to each other. In this case, the value of n is 10 and the value of N is 9, where the value of n is larger. Thus, the process proceeds to S508.

In S508, the CPU 102 increments the value of m. Accordingly, the value of m is set to 2. Further, the value of n is returned to 1. The value of m represents a priority level in face information analysis for the shooting mode shown in FIG. 7. When the value of m reaches 2, the shooting mode of images to be searched is changed to Kids.

In S509, the CPU 102 compares the values of m and M to each other. The value of M is the total number of shooting modes, and is used for determining whether or not the images of all the shooting modes have been searched. As shown in FIG. 7, seven shooting modes are registered in the image management application, and thus the value of M is 7. In this case, since the value of m is smaller than the value of M, the process returns to S502, and the CPU 102 determines whether or not the first image has been searched. The images 305 and 306 with a Portrait shooting mode have been searched in the process up to this point. Thus, the process proceeds to S503.

Thereafter, the above-mentioned processes are repeated. When the images of all the shooting modes have been searched, the value of m reaches 8 in S509. Thus, the process ends.

In this way, the person search is executed on images in descending order of their priority level shown in FIG. 7, thereby making it possible to preferentially search images with high probability of showing a person.

FIG. 3B shows the order of the images to be searched when performing the person search of FIG. 5. As shown in a column 310, images of a shooting mode with a high probability of showing a person are preferentially searched. Further, images with a low probability of showing a person, such as those of a Landscape or Night scene shooting mode, are searched later.

Figure 2B:
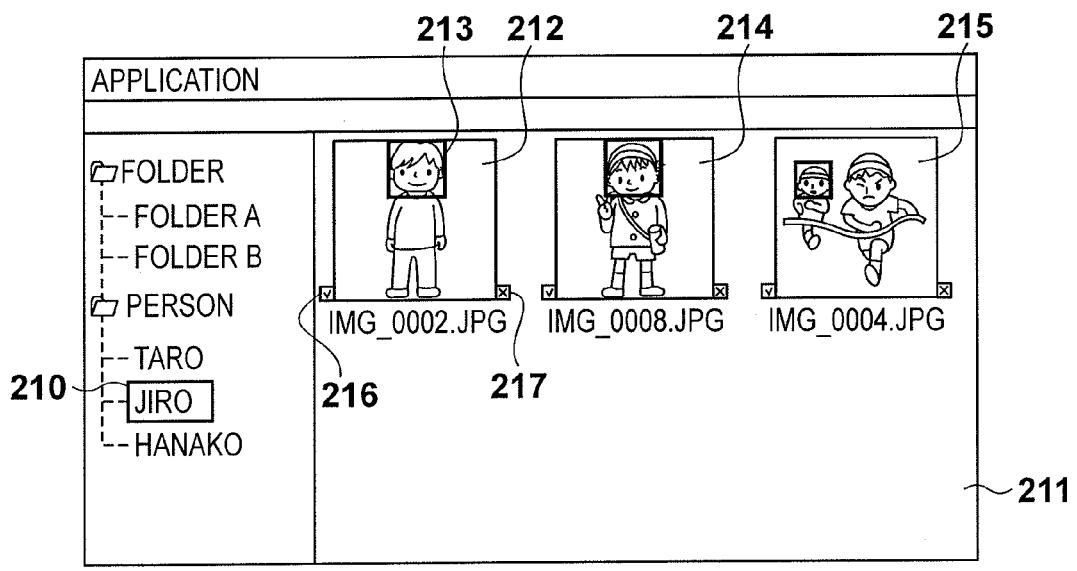

FIG. 2B exemplifies the screen of the image management application after the search of "Jiro" has been executed according to the person search processing of FIG. 5. When the user selects "Jiro" denoted by 210 in the person tree, images of the search results are sequentially displayed in the search result display area 211. In the case where nine images shown in FIG. 3A are registered therein, an image 212 is first displayed as a search result. Here, a face frame 213 showing a face position is displayed on the image 212. Then, the search results are displayed in the order of 214 and 215. Further, images displayed in the search result display area 211 are candidate images of a person name "Jiro". In the case where the images as search results correctly include "Jiro", it can be confirmed that the person in this image is "Jiro" by selecting a confirmation button 216. Upon the confirmation of the presence of "Jiro", the person name "Jiro" is written in a predetermined region of the image data. Meanwhile, it is registered in a database of the image management application that the image having a file name of IMG_0002.JPG shows "Jiro". The registration that the IMG_0002.JPG shows "Jiro" in the database of the image management application eliminates the need for the aforementioned face information analysis in the cases of searching for "Jiro" the next or subsequent time, so that the image of IMG_0002.JPG can be displayed immediately as a search result. Meanwhile, there may be cases where, despite searching "Jiro", an image showing another person who is not "Jiro" is displayed as a search result. In the case where another person different from the person being searched for is found, it can be registered in the database of the image management application that the person in the image is not "Jiro" by selecting an exclusion button 217.

<Similarity Determination Processing>

Here, similarity determination processing in S505 of FIG. 5 is described in detail with reference to FIG. 6.

Figure 6:
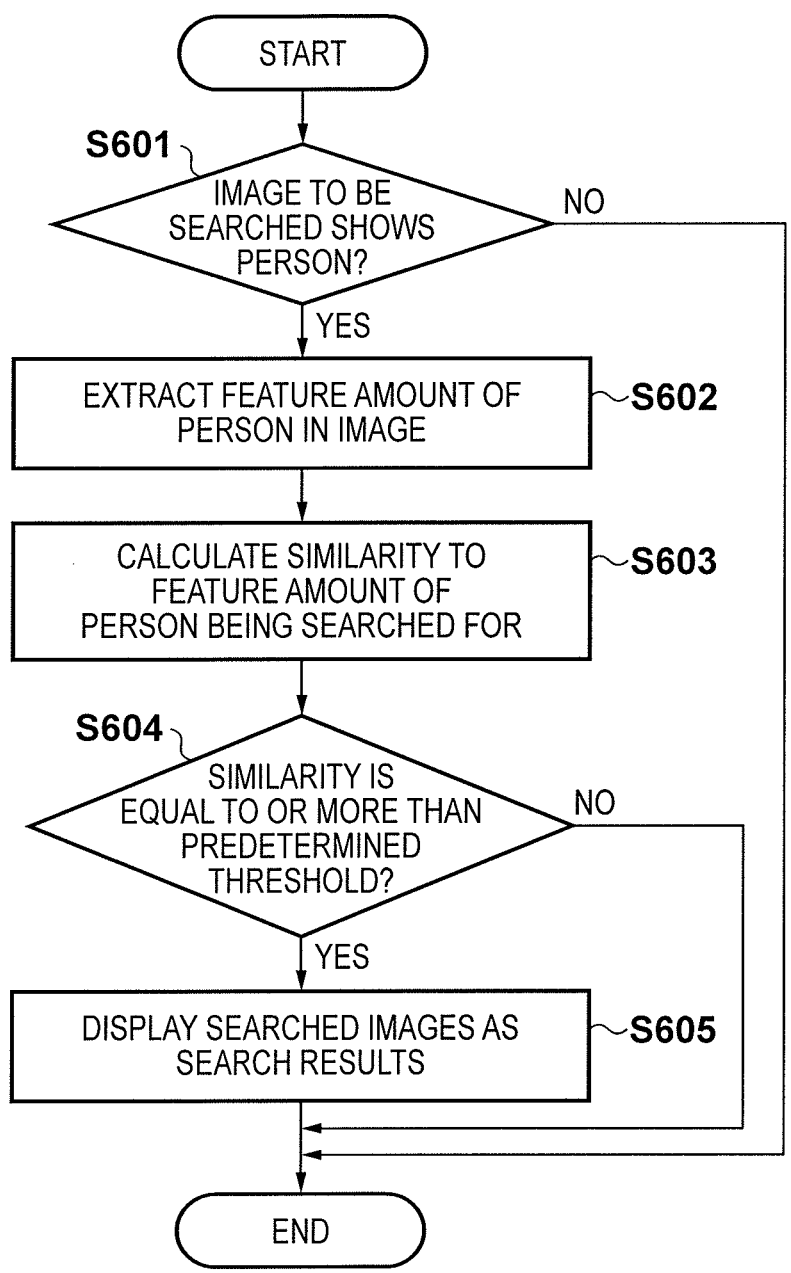
FIG. 6 is a flow chart showing, in detail, similarity determination processing in FIG. 5.

In the process of FIG. 6, the feature amount of the person being searched for and the feature amount of a person in the image to be searched are compared to each other, so that their similarity is calculated. Images with such a similarity that is equal to or more than a predetermined threshold are determined as candidates for the person being searched for, and thus are displayed on the screen of the image management application. According to the aforementioned process of FIG. 5, the image to be determined first in S505 is the image file 305 of FIG. 3A.

In S601 of FIG. 6, the CPU 102 determines whether or not a person is in the image to be searched. Since a person is contained in the image 305, the process proceeds to S602. It should be noted that the description of processing of detecting a person contained in an image is omitted herein.

In S602, the CPU 102 calculates the feature amount of the person in the image.

In S603, the CPU 102 compares the thus calculated feature amount and the feature amount of the person being searched for to each other, thereby calculating their similarity. This similarity is a value representing how much the person resembles the other person, which can range from 0 to 100. That is, it can be estimated that the person does not resemble the other person when the similarity is low, and that the person resembles the other person when the similarity is high. It is assumed herein that the similarity between the person with the person name "Jiro" selected from the person tree 203 in FIG. 2A and the person in the image file 305 in FIG. 3A is 90.

In S604, the CPU 102 determines whether or not the calculated similarity is equal to or more than a predetermined threshold. That is, when it is equal to or more than the predetermined threshold, the CPU 102 determines the person in the image file 305 as a candidate for the person being searched for. It is assumed herein that the threshold is set to 70. When the threshold is 70, the similarity calculated in S603 is 90, which exceeds the threshold. Therefore, the process proceeds to S605. It is also possible to set a threshold to be used for determination of the similarity corresponding to the attribute information such as the shooting mode that is included in the images to be searched.

Figure 2C:
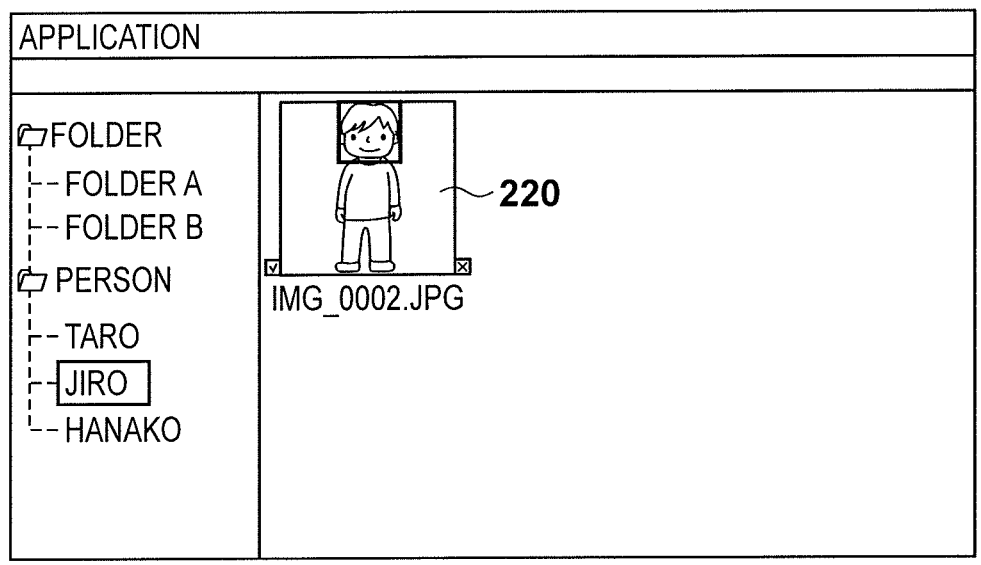

In S605, the CPU 102 displays the image 305 that is currently being searched as a search result. That is, only an image 220 is displayed as shown in FIG. 2C. In this way, the search results are sequentially displayed, thereby reducing user waiting time for the search results.

<Modification>

According to the description so far, person search processing has been executed on images in descending order of the priority level stored by the image management application corresponding to the shooting mode shown in FIG. 7. In contrast, the following description is given with reference to FIG. 8 for a process in which images of a specific shooting mode are subsequently searched. That is, a low priority level is set for images that have been shot in a specific shooting mode and are thus determined to have a low probability of showing a person, so that such images are subsequently searched. It is assumed herein that images with a Landscape shooting mode of are set to be subsequently searched, which however is not restrictive. It is also possible to set a low priority level for images shot in a Macro shooting mode. Further, the shooting mode for subsequent search is selected from the shooting modes stored by the image management application. It is assumed that nine images shown in FIG. 3A are registered in the image management application in the same manner as in the aforementioned description. Further, description is given for the case where the user has selected the person name "Jiro" from the person tree 203 of FIG. 2A.

Figure 8:
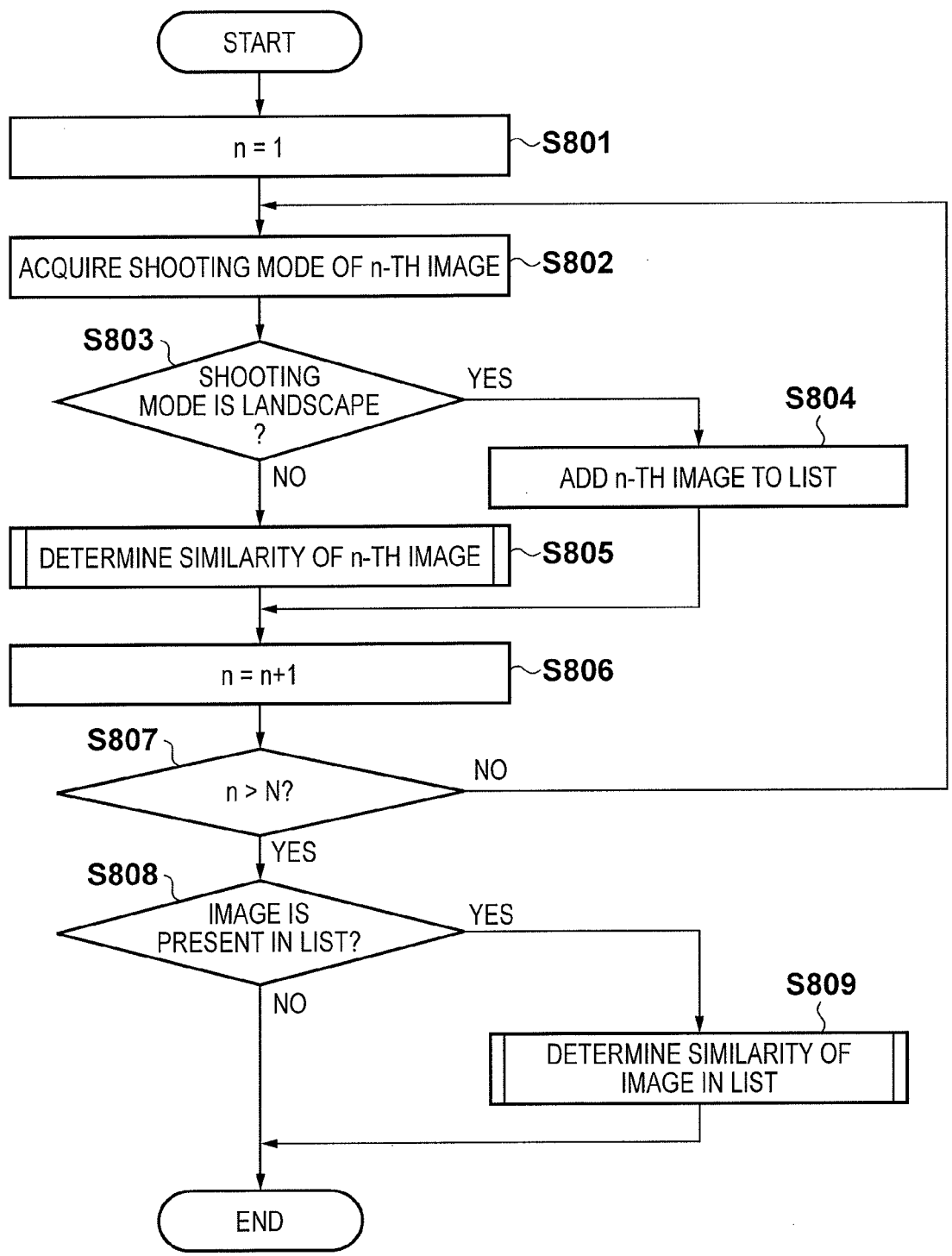
FIG. 8 is a flow chart showing person search processing using the priority levels corresponding respectively to the shooting modes in FIG. 7.

In S801 of FIG. 8, the CPU 102 initializes the value of n to 1. In the same manner as in the process of FIG. 5, the value of n is an index for the image to be searched.

S802 is the same as S503 of FIG. 5, where the shooting mode of the image is acquired.

In S803, the CPU 102 determines whether or not the acquired shooting mode is Landscape. Since the shooting mode of the first image is Landscape, the process proceeds to S804.

In S804, the CPU 102 adds the first image to a list. The list herein is a list of images determined to be searched later. That is, the image with a Landscape shooting mode has a low probability of showing a person, and thus is searched later.

S806 is the same as S506 of FIG. 5, where the value of n is incremented.

S807 is the same as S507 of FIG. 5, where it is determined whether or not the last image has been reached. The value of n is 1 at present, and thus the process returns to S802.

Next, the shooting mode of the second image is acquired in S802, which is Portrait. In S803, the CPU 102 makes a determination based on the shooting mode. Since the shooting mode is Portrait, which is different from Landscape, the process proceeds to S805. S805 is the same as S505 of FIG. 5, where it is determined whether or not "Jiro" is included in the second image. In the case where "Jiro" is included therein, the image is displayed.

As the above processes are repeated for each of the nine images to be searched, the value of n reaches 10 in S806. In S807, when the values of n and N are compared to each other, n is 10 and N is 9, where the value of n is greater. Thus, the process proceeds to S808.

In S808, the CPU 102 determines whether or not the image is on the list. The list herein is the list of images with a Landscape shooting mode that have been added in S804. As seen from FIG. 3A, among the images registered in the image management application, there are two images having a Landscape shooting mode. Therefore, the process proceeds to S809.

In S809, the CPU 102 determines the similarity of each image on the list. The similarity determination processing herein is the same as in S805.

In this way, on the assumption that images of a predetermined shooting mode have a low probability of showing a person, their face information is searched later. Further, one shooting mode is set for delaying the search in the aforementioned example. However, a plurality of shooting modes may be set therefor.

Figure 9:
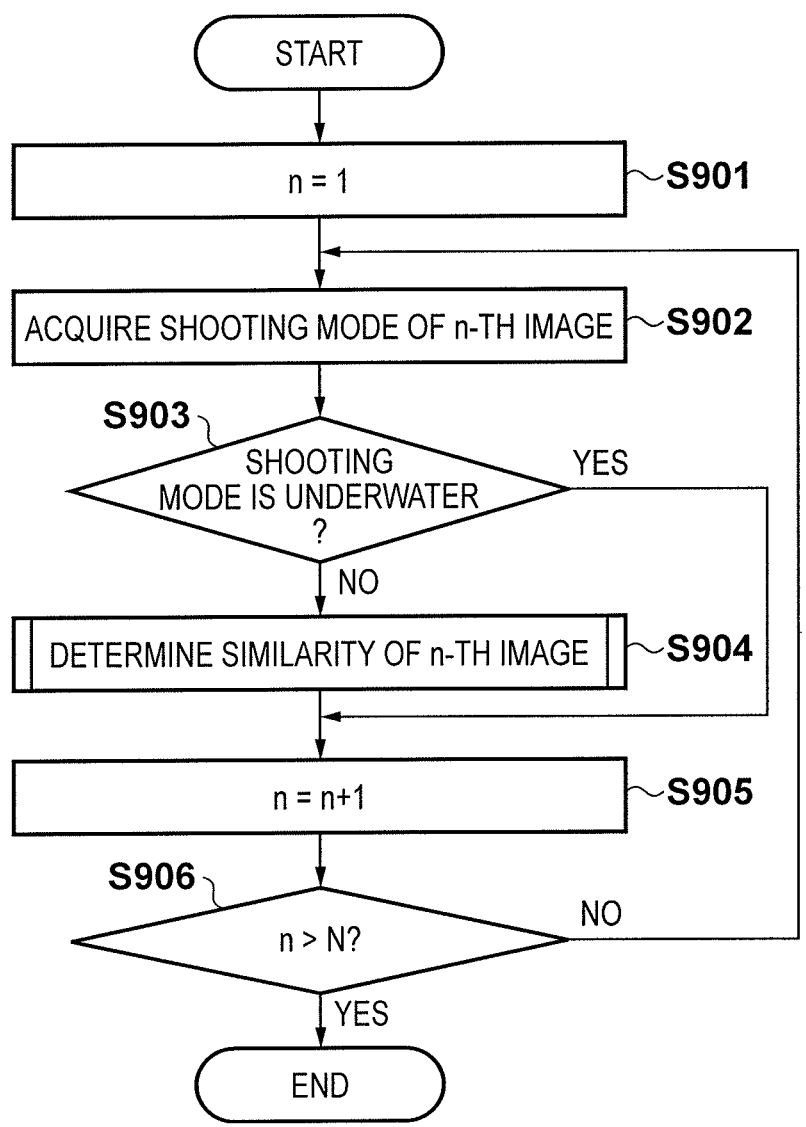
FIG. 9 is a flow chart showing person search processing using the priority levels corresponding respectively to the shooting modes in FIG. 7.

Next, a process in which images of a specific shooting mode are excluded from the images to be searched is described with reference to FIG. 9. It is assumed herein that images with an Underwater shooting mode are excluded from the images to be searched. It should be noted that the shooting mode based on which images are excluded from the images to be searched is selected from the shooting modes stored by the image management application. It is assumed that nine images shown in FIG. 3A are registered in the image management application in the same manner as in the aforementioned description. Further, description is given for the case where the user has selected the person name "Jiro" from the person tree 203 of FIG. 2A. In the process of FIG. 9, description for the same or similar process as in FIG. 8 is omitted, and points different from the process of FIG. 8 are focused in the following description.

S901 to 902 of FIG. 9 are the same as S801 to 802 of FIG. 8. Further, S903 is the same as S803 except that the shooting mode based on which determination is made is changed to Underwater. Here, since the first image has a Landscape shooting mode, the process proceeds to S904. S904 to 906 are the same as S805 to 807 of FIG. 8. As the above processes are repeated, the process proceeds from S903 to S905 when the value of n reaches 3 because the third image has an Underwater shooting mode. In this way, it is possible to exclude images of a shooting mode with an exceptionally low probability of showing a person from the images to be searched. Such exclusion of images that seem unnecessary for face information analysis from the images to be searched enhances the probability of rapidly finding images showing the person being searched for.

As the above processes are repeated for each of the nine images to be searched, the value of n reaches 10 in S905. When the value of n reaches 10, which is larger than 9, that is the value of N, the search is terminated. Further, one shooting mode is set for excluding images in the aforementioned example. However, a plurality of shooting modes may be set therefor.

It should be noted that images of such a shooting mode set for exclusion from the images to be searched may be searched after the completion of searching images that have not been excluded therefrom automatically or manually by the user.

<Priority Determination Method>

Next, a method for dynamically determining a shooting mode, images of which are set to be preferentially searched, is described. It is assumed herein that 1000 images are registered in the image management application for convenience of description.

FIG. 10 shows classified data of the images registered in the image management application according to their shooting mode. As seen from a column 1001 showing shooting modes, there are five shooting modes set for the images registered in the image management application. As seen from a row 1002, there are 150 images with a Kids shooting mode, among which 120 images have their corresponding person name added thereto. The images to which their corresponding person name has been added means those to which their person name has been added by selecting the confirmation button 216 in FIG. 2B. Accordingly, the person name has been added to 80% of the images with a Kids shooting mode. Likewise, as seen from a row 1003, there are 300 images with a Portrait shooting mode, among which 210 images have their person name added thereto. Accordingly, the person name has been added to 70% of the images with a Portrait shooting mode. FIG. 10 shows the percentage of images with their person name added thereto, which is calculated as mentioned above for the shooting mode, in all the images registered in the image management application. It can be seen from this that the tendency that the user adds a person name to an image with a Kids shooting mode is high. In contrast, it can be seen that the tendency that the user adds a person name to an image with a Fireworks shooting mode is low.

From above, the probability of rapidly finding images showing the person being searched for is considered to be enhanced by preferentially searching images with a shooting mode in which the percentage of images with their person name added thereto is high. Therefore, when the person search processing of FIG. 5 is executed, searching images with a shooting mode in which the percentage of images with their person name added thereto is high is prioritized. That is, in S501 of FIG. 5, images with a Kids shooting mode are analyzed when the value of m is 1, thereafter images are analyzed in the order of their shooting mode, i.e., Portrait, Landscape, Underwater, and Fireworks. This can eliminate the need for the image management application to store the shooting mode, images of which are set to be preferentially searched.

<Example Using Attribute Information Other than Shooting Mode>

Description has been given so far on the assumption that attribute information to be acquired from the images to be searched is their shooting mode. However, it is also possible to perform the search using attribute information other than the shooting mode. A focal length of an image capturing apparatus at the time of shooting can be mentioned as one example of such attribute information other than the shooting mode. Generally, wide-angle shooting is often selected in the case of shooting an object at a short distance, and therefore the focal length at the time of shooting tends to be short. In contrast, in the case of shooting an object at a long distance, the viewing angle is often narrowed and a telescopic lens is likely to be used for shooting, and therefore the focal length at the time of shooting tends to be long. In consideration that a person is mostly shot at a short distance, the focal length should be short. Conversely, in the case of shooting a part of landscape at a long distance, the focal length should be long. From above, images shot at a long focal length are assumed to have a low probability of showing a person, and their face information is analyzed later.

Figure 11A:
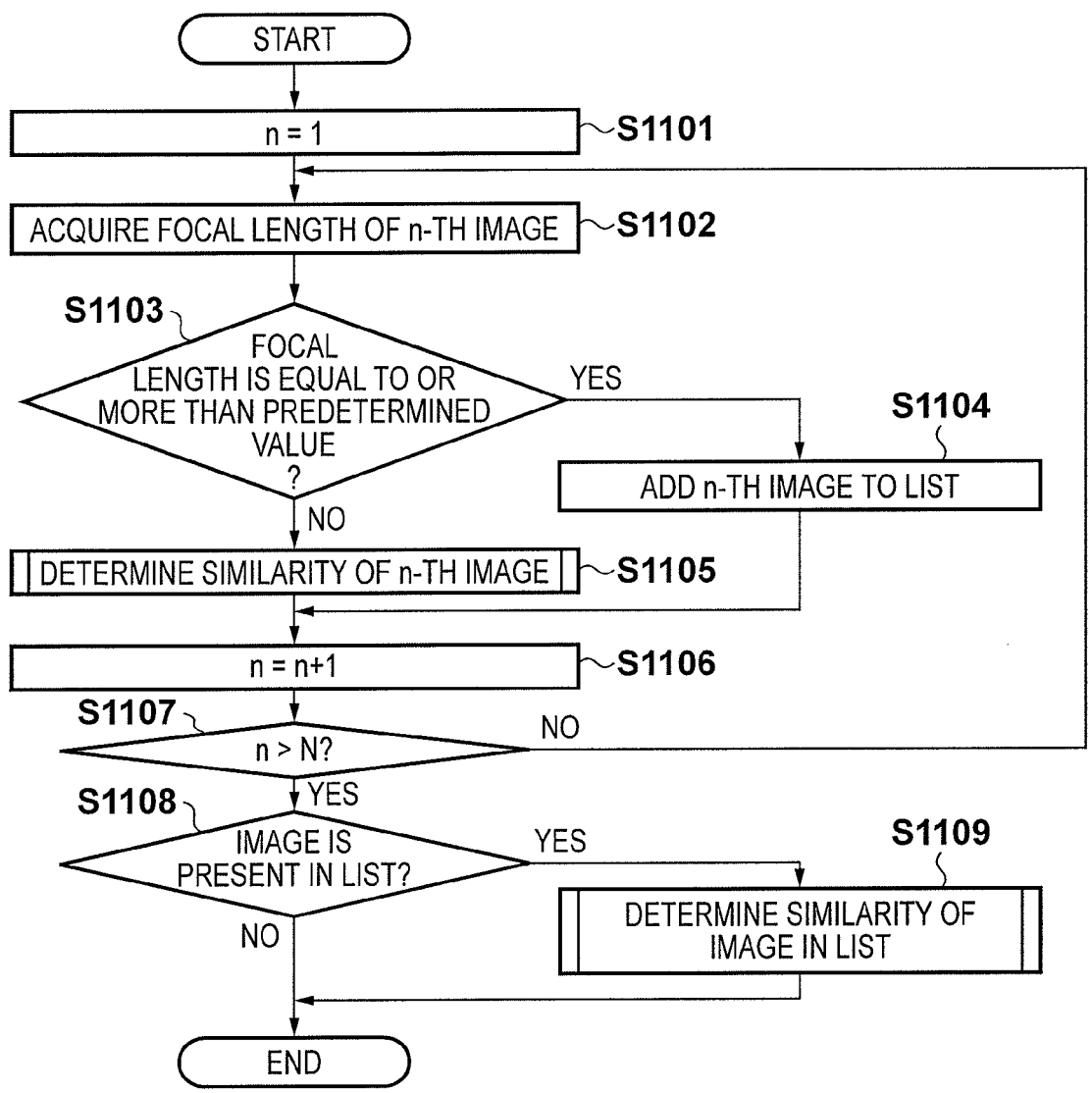
FIGS. 11A and 11B are flow charts showing person search processing of this embodiment using image attribute information other than the shooting modes.
Figure 12:
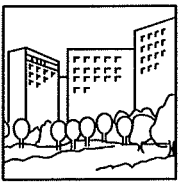
FIG. 12 is a view exemplifying a database configuration of this embodiment in which image attribute information other than the shooting modes is registered.
Figure 12:
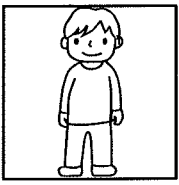
Figure 12:
Figure 12:
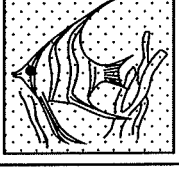
Figure 12:
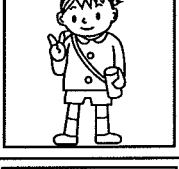
Figure 12:

The value of the focal length of digital cameras having a zoom function can range from 4.0 mm to 48 mm. FIG. 12 shows six images registered in the image management application and their focal length. Further, it is assumed herein that an image with a focal length of 25 mm or more is determined to be a landscape image at a long distance, and its face information is analyzed later. FIG. 11A shows a process in which the focal length of an image at the time of shooting is acquired, and the analysis is delayed if the acquired focal length is equal to or more than a predetermined value. In the process of FIG. 11A, description for the same or similar process as in FIG. 8 is omitted, and any differences from the process of FIG. 8 are focused in the following description.

In FIG. 11A, S1101 is the same as S801 of FIG. 8. Further, S1102 is the same as S802 except that the attribute information to be acquired is changed to the focal length.

In S1103, the CPU 102 determines whether or not the focal length acquired in S1102 is equal to or more than a predetermined value. As shown in FIG. 12, the first image has a focal length of 30 mm, which exceeds 25 mm that is the aforementioned threshold. Accordingly, the process proceeds to S1104. In this way, it is possible to delay the analysis of images with a focal length equal to or more than a predetermined value. S1104 to 1109 are the same as S804 to 809 of FIG. 8.

As the above processes are repeated, the process proceeds from S1103 to S1105 when the value of n is 2 because the second image has a focal length of 10 mm. In this way, it is possible to preferentially analyze the face information of images with a short focal length, that is, images with a high probability of showing a person. In order to express a focal length of an image capturing apparatus, an equivalent 35-mm film value is often used. In the above description, the value of the focal length of the image capturing apparatus is used as it is; however, it is also possible to use an equivalent 35-mm film value of the focal length in the same manner.

Figure 11B:
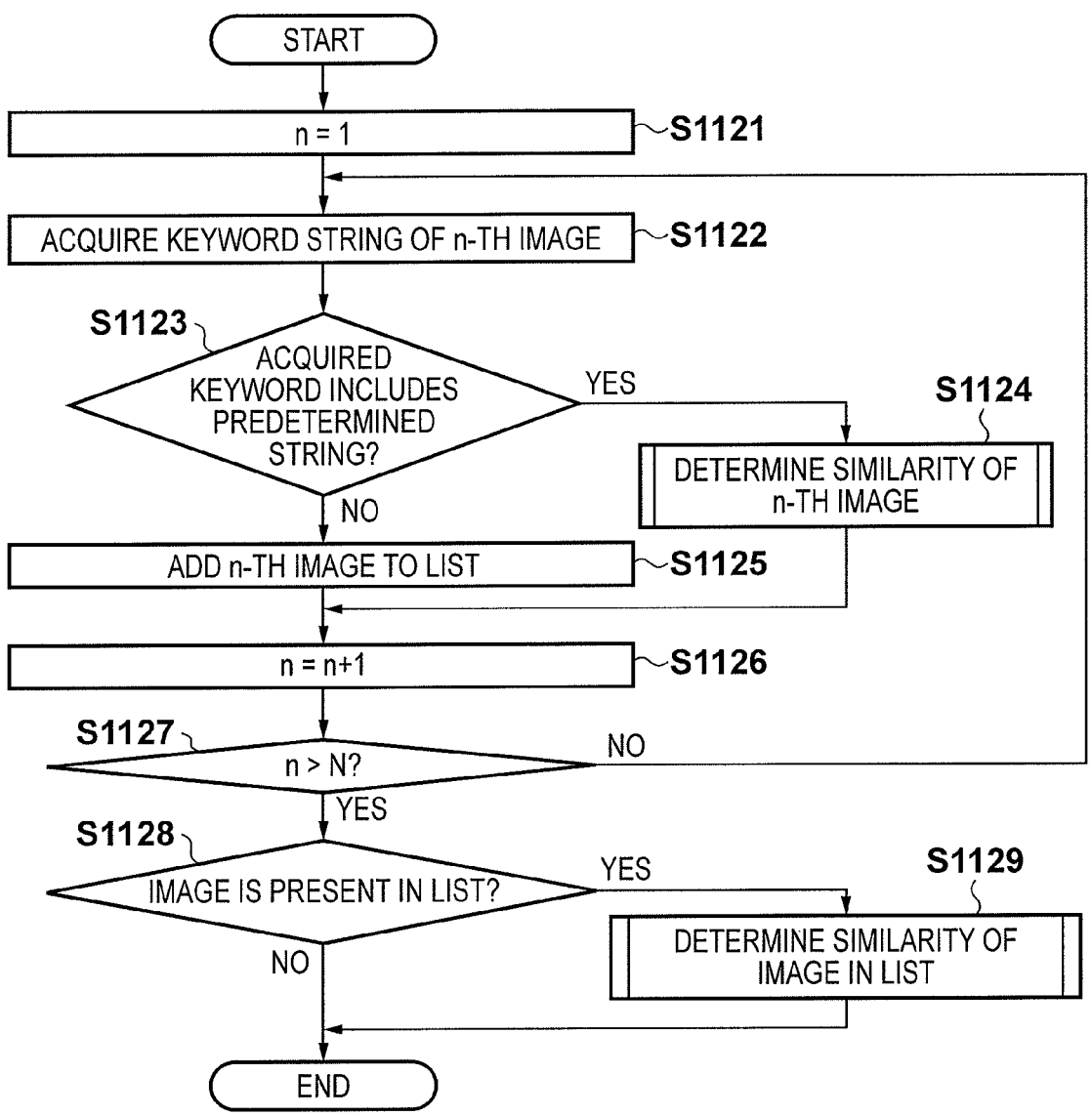

Next, description is given for an example in which the search is performed using a keyword string included in an image as one piece of the attribute information other than the shooting mode. This keyword string represents the object of an image as a keyword. For example, a keyword "Family" is added to family pictures, thereby enabling images to be searched or to be classified by using the keyword "Family". In this way, the keyword string included in an image can be utilized as information representing the object. In this regard, there are already known methods for adding a keyword by the image management application of this embodiment, and thus description thereof is omitted. Further, the region in which the keyword string is written is defined in a schema. For example, in a schema called XMP (Adobe Extensible Metadata Platform), a region called dc:subject is defined, which is recommended as an area for storing keywords. Accordingly, when keywords are written into the aforementioned dc:subject by another application, it is possible to acquire a keyword string of an image in the process flow, which will be described later. FIG. 12 shows images registered in the image management application and their respective keyword strings. Further, images with a keyword string including "Family" are assumed to have a high probability of showing a person, and their face information is preferentially analyzed. FIG. 11B shows a process in which a keyword included in an image is acquired, and if the acquired keyword includes a predetermined string, its face information is preferentially analyzed. In the process of FIG. 11B, description for the same or similar process as in FIG. 8 is omitted, and ant differences from the process of FIG. 8 are focused on in the following description.

In FIG. 11B, S1121 is the same as S801 of FIG. 8. Further, S1122 is the same as S802 except that the attribute information to be acquired is changed to the keyword string.

In S1123, the CPU 102 determines whether or not a predetermined string is included in the keyword acquired in S1122. As shown in FIG. 12, a keyword "Landscape" is added to the first image. However, a string "Family" is not included therein, and thus the process proceeds to S1125. S1125 to 1129 are the same as S804 to 809 of FIG. 8.

As the above processes are repeated, the process proceeds from S1123 to S1124 when the value of n is 3 because the keyword of the third image is "Family". S1124 is the same as S805 of FIG. 8. In this way, it is possible to preferentially analyze the face information of images including a keyword string associated with a person, that is, images with a high probability of showing a person. Further, in the aforementioned example, only one predetermined string "Family" is set. However, a plurality of strings, such as "People" and "Person", may be set.

Second Embodiment

In the above-mentioned first embodiment, an example in which a person designated by the user is searched for has been described. Hereinafter, description is given for a process in which, when images are sequentially registered in the image management application, their face information is analyzed concurrently with the registration of the images, and the analysis results are also registered therein.

Figure 13A:
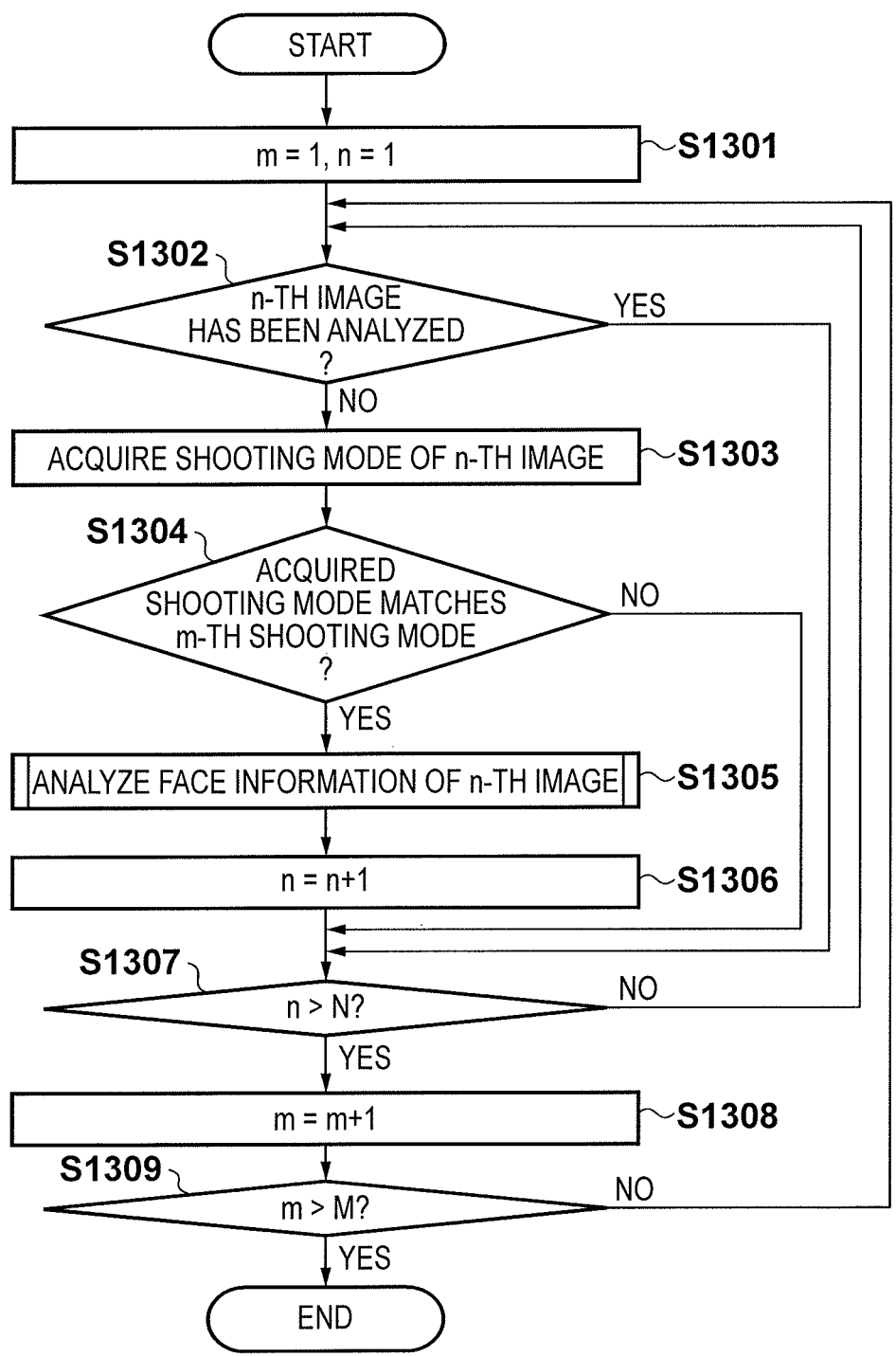

The system configuration of this embodiment is the same as in the first embodiment. In this embodiment, description is given for a process in which, when nine images shown in FIG. 3A are registered in the image management application, the face information of each person is analyzed, and the calculated feature amount thereof is registered in the database. FIG. 13A shows a process in which the shooting mode of an image to be registered is acquired at the time of registration of the image, and the face information is analyzed in accordance with the priority level corresponding to the acquired shooting mode. It should be noted that the priority level corresponding to the shooting mode is the same as in FIG. 7. Further, since the process of FIG. 13A is different from that of FIG. 5 only by S1305, description for processes other than S1305 is omitted. In the process of FIG. 5, the similarity is determined in S505. However, in S1305 of FIG. 13B, the face information is analyzed and registered in the database.

In S1311 of FIG. 13B, the CPU 102 determines whether or not a person is shown in the image to be analyzed. In the image 305, which is first to be analyzed, a person is contained, and thus the process proceeds to S1312. It should be noted that the description of processing of detecting a person contained in an image is omitted.

In S1312, the CPU 102 calculates the feature amount of the person in an image.

In S1313, the CPU 102 registers the thus calculated feature amount in the DB. The thus registered feature amount can be utilized for the person search described in the first embodiment. In the first embodiment, the feature amount of the person in an image is calculated at the time of the search. However, the processing load at the time of the search can be reduced by carrying out such calculation of the feature amount at the time of the registration of the image, as in this embodiment. In the case where no person is in the image, as in 304, the process skips S1312 and S1313.

FIG. 3C shows the analysis results for all the nine images by repeating the above processes. As seen from FIG. 3C, images of a shooting mode with a high probability of showing a person are set as the images to be preferentially searched. Further, images of a shooting mode with a low probability of showing a person such as Landscape and Night scene are set to be analyzed later.

Figure 14:
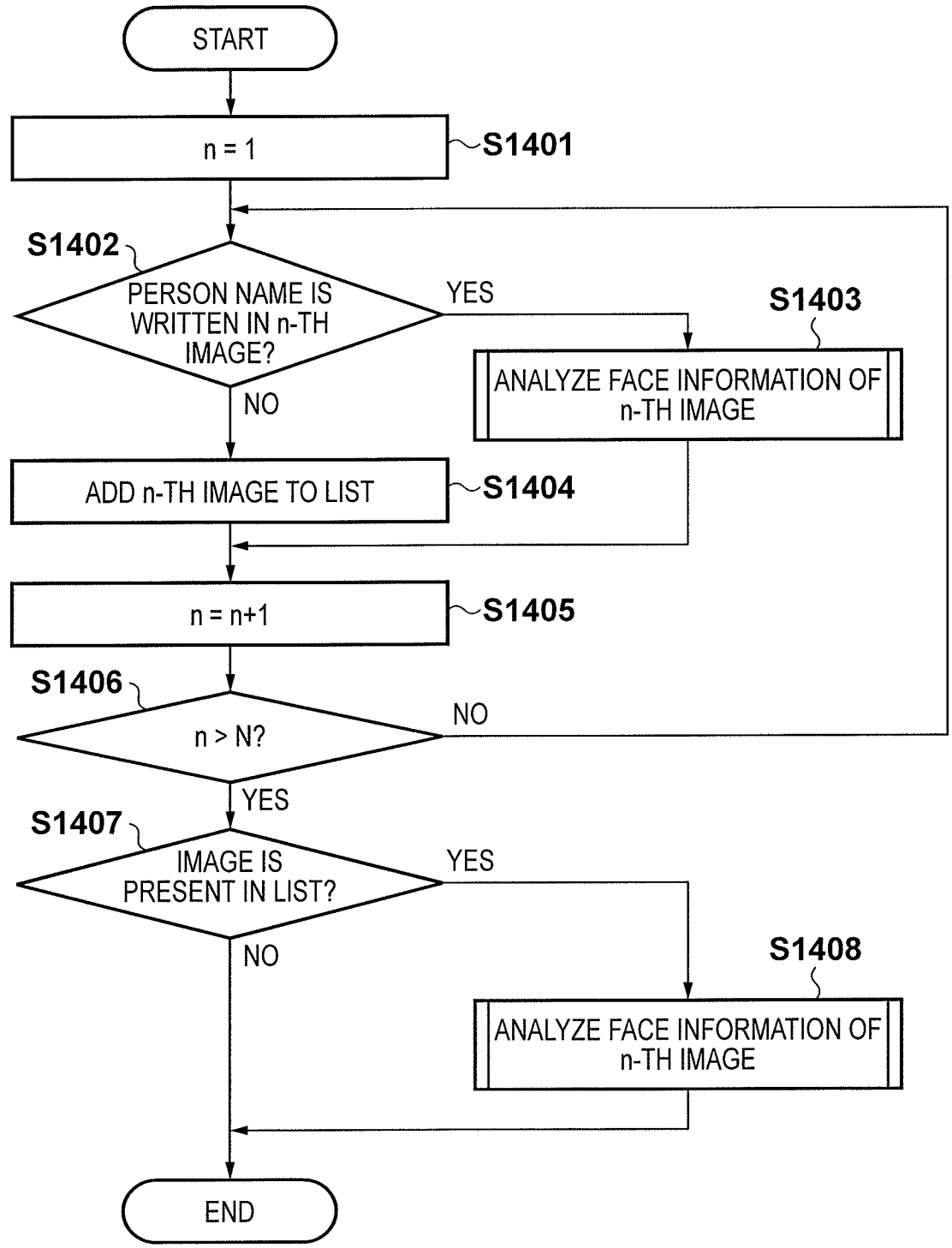
FIG. 14 is a flow chart showing person search processing of the second embodiment using image attribute information other than the shooting modes.

Next, description is given for an example in which the priority level is determined using the person name that has been added to each image as one piece of the attribute information other than the shooting mode. As has been described in the first embodiment, a person name can be added to the image. The person name can be added by the image management application of this embodiment or also by another apparatus. In this way, it is possible to rapidly execute the person search as described in the first embodiment by preferentially analyzing images to which their person name has been added. Further, since processing of the face detection is different depending on the image processing apparatus, there are cases where the subject apparatus analyzes an image again even if a person name has already been added thereto by another apparatus. In such a case, it is enabled to preferentially analyze images that have been recognized as including a person name. Here, FIG. 12 shows six images and their person name registered in the image management application. FIG. 14 shows a process in which images including a person name are preferentially analyzed by determining whether or not the person name has been added to the images. In the process of FIG. 14, description for the same or similar process as in FIG. 11A is omitted, and any differences from the process of FIG. 11A are focused on in the following description.

In FIG. 14, S1401 is the same as S1401 of FIG. 11A. Further, S1402 is the same as S1103 except that the criteria for determination is changed from the value of the focal length to the presence or absence of a person name. Here, the first image does not include a person name, and thus the process proceeds to S1404. S1404 to 1408 are the same as S1104 and S1106 to S1109 of FIG. 11A. In the same manner, the second image includes a person name, and thus the process proceeds from S1402 to S1403. Since S1403 is the same process as in FIG. 13B mentioned above, the description thereof is omitted. In this way, it is possible to preferentially analyze images including their person name.

It should be noted that the attribute information may be not only one, and may be set as search criteria, using a plurality of pieces of attribute information in combination, for example, those with a Macro shooting mode and a distance from the object of 10 cm, or those with a Portrait shooting mode and a distance from the object of 1 m or less.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-081657, filed Apr. 9, 2013 which is hereby incorporated by reference herein in its entirety.

What is claimed is:

1. An image processing apparatus comprising:
   a storage configured to store feature information of a predetermined object;
   a central processing unit (CPU) configured to execute a control program to:
   detect feature information of an object from an image to be searched and determine a similarity to the feature information of the predetermined object stored in the storage;
   search a candidate image containing the predetermined object as a result of the determination by the CPU, and
   control, based on attribute information associated with image-shooting condition of each image, the order of images which are subjected to perform the determination processing by the CPU, from a plurality of images.

2. The apparatus according to claim 1, wherein the attribute information is a shooting mode.

3. The apparatus according to claim 2, wherein the CPU gives a high priority level in the determination processing to images shot in shooting modes of Portrait and Kids, and gives a low priority level in the determination processing to images shot in shooting modes of Macro and Landscape.

4. The apparatus according to claim 1, wherein the attribute information is focal length information.

5. The apparatus according to claim 1, wherein the attribute information is a keyword.

6. The apparatus according to claim 1, wherein the feature information is information representing features of a person's face.

7. The apparatus according to claim 1, wherein the CPU excludes an image with specific attribute information from those subject to the determination process.

8. The apparatus according to claim 1, wherein the CPU delays the determination processing for an image with specific attribute information.

9. The apparatus according to claim 2, wherein the CPU gives a high priority level in the determination processing, among images to be searched, to those shot in a shooting mode having a high percentage of images with their person name registered.

10. An image processing method comprising the steps of:
    storing feature information of a predetermined object in a storage;
    detecting feature information of an object from an image to be searched;
    determining a similarity to the feature information of the predetermined object stored in the storage;
    searching a candidate image containing the predetermined object as a result of the determination, and
    controlling, based on attribute information associated with image-shooting condition of each image, the order of images to be subjected to perform processing in the determining step, from a plurality of images.

11. A non-transitory computer-readable storage medium storing a program for causing a computer to execute an image processing method comprising the steps of:
    storing feature information of a predetermined object in a storage;
    detecting feature information of an object from an image to be searched;
    determining a similarity to the feature information of the predetermined object stored in the storage;
    searching a candidate image containing the predetermined object as a result of the determination, and
    controlling, based on attribute information associated with image-shooting condition of each image, the order of images to be subjected to perform processing in the determining step, from a plurality of images.

12. The storage medium according to claim 11, wherein the attribute information is a shooting mode.

13. The storage medium according to claim 12, wherein in the controlling step, a high priority level is given in the determination processing to images shot in shooting modes of Portrait and Kids, and a low priority level is given in the determination processing to images shot in shooting modes of Macro and Landscape.

14. The storage medium according to claim 11, wherein the attribute information is focal length information.

15. The storage medium according to claim 11, wherein the attribute information is a keyword.

16. The storage medium according to claim 11, wherein the feature information is information representing features of a person's face.

17. The storage medium according to claim 11, wherein in the determining step, an image with specific attribute information is excluded from those subject to the determination process.

18. The storage medium according to claim 11, wherein in the determining step, the determination processing for an image with specific attribute information is delayed.

19. The storage medium according to claim 12, wherein in the controlling step, a high priority level is given in the determination processing, among images to be searched, to those shot in a shooting mode having a high percentage of images with their person name registered.

* * * * *